United States Patent
Alabsi et al.

(10) Patent No.: US 10,237,135 B1
(45) Date of Patent: Mar. 19, 2019

(54) COMPUTING OPTIMIZATION

(71) Applicant: Amazon Technologies, Inc., Reno, NV (US)

(72) Inventors: Mohammed Samir Alabsi, Mercer Island, WA (US); Pavel Kheyfets, Kirkland, WA (US); Yasemin Avcular, Seattle, WA (US); Stephen Alden Elliott, Seattle, WA (US); Hungpin Kao, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/196,764

(22) Filed: Mar. 4, 2014

(51) Int. Cl.
*G06F 15/173* (2006.01)
*H04L 12/24* (2006.01)

(52) U.S. Cl.
CPC .................. *H04L 41/0896* (2013.01)

(58) Field of Classification Search
CPC ........... G06F 15/16; G06F 9/455; G06F 21/00
USPC ....................................................... 709/226
See application file for complete search history.

(56) References Cited

U.S. PATENT DOCUMENTS

| | | | | |
|---|---|---|---|---|
| 2009/0276771 | A1* | 11/2009 | Nickolov | G06F 9/4856 717/177 |
| 2011/0276477 | A1* | 11/2011 | Shuster | G06Q 20/10 705/39 |
| 2012/0272234 | A1* | 10/2012 | Kaiser | G06F 11/3442 718/1 |
| 2014/0052850 | A1* | 2/2014 | Doorhy | H04L 43/0876 709/224 |

* cited by examiner

*Primary Examiner* — Normin Abedin
(74) *Attorney, Agent, or Firm* — Thorpe North & Western, LLP

(57) ABSTRACT

A technology to optimize virtualized computing is described. Usage of a plurality of virtualized computing instances is identified in a virtualized computing environment. Purchasing configuration optimization rules are applied to calculate an optimized purchasing configuration for the plurality of virtualized computing instances in a virtualized computing environment. The optimized purchasing configuration is recommended for the plurality of virtualized computing instances.

20 Claims, 8 Drawing Sheets

COMPUTING OPTIMIZATION

BACKGROUND

Data centers housing significant numbers of interconnected computing systems have become commonplace, such as private data centers that are operated by and on behalf of a single organization, and public data centers that are operated by entities as businesses to provide computing resources to customers. Some public data center operators may provide network access, power, and secure installation facilities for hardware owned by various customers, while other public data center operators provide full service software and hardware facilities that may also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, while also providing application isolation and security among the various virtual machines.

A virtualized computing resource provider may sell usage of computing resources in a public data center to customers by leveraging virtualization technology. Some virtualized computing resource providers may allow customers to reserve or purchase access to resources in any of several different resource purchasing configurations. For example, a customer may reserve a virtual computing instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the data center.

DETAILED DESCRIPTION

Figure 1:
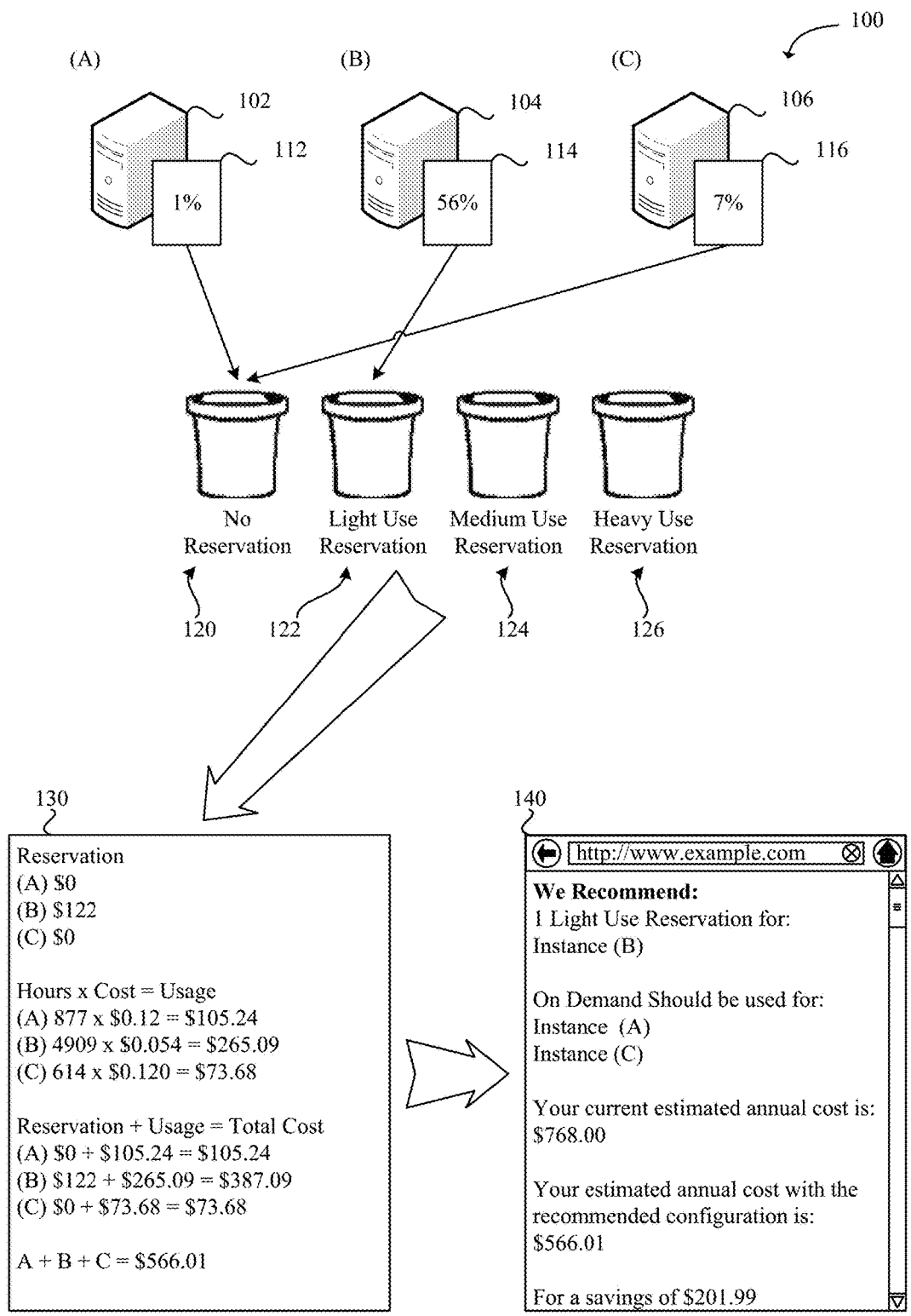
FIG. 1 illustrates an example optimization in a virtualized computing environment.

A technology to optimize computing resource allocation is described. In one example, the technology may be used to lower a customer's cost in consuming computing resources. In another example, the technology may assist a computing resource provider in selling and making an ideal amount of capacity available for computing loads. Another optimization may include providing a large amount of computing resources to a customer for a short period of time.

A computing environment may be implemented by a computing resource provider to make computing resources available to customers. The computing resources provided by the computing environment may include various classes of computing resources, such as data processing resources, data storage resources, networking resources, application resources and the like. Each class of a computing resource may be general-purpose computing resources or may be available in a number of specific configurations. A computing resource provider may make these computing resources available in discrete units, or computing instances. A computing instance may be a unit of a virtualized computing resource where each virtual computing instance may represent the virtualized data processing resources of a dedicated server, or may represent a virtual machine instance executing on a physical server. A virtualized computing environment may include multiple servers executing multiple virtual computing instances.

Statistics may be collected, collated and analyzed to identify usage of the computing instances. A customer with 10 computing instances may use each of the 10 computing instances in a different way. One computing instance may be used to process payroll for the customer once a month. Another computing instance may be used to host a site on the Internet. A group of 8 computing instances may be used in a dynamically scaling computing cluster that executes simulations of an airplane that the customer is designing. While the customer may have an existing purchasing configuration for the computing instances, the customer may be unsure whether there is some other purchasing configuration that would be less expensive while providing the customer access to the same computing resources.

The technology, therefore, may include applying purchasing configuration optimization rules to calculate an optimized purchasing configuration for the plurality of computing instances in a computing environment. As an example, purchasing configuration optimization rules may dictate that a heavily used computing instance should have a purchasing configuration that includes a reservation with an upfront cost to provide a better value to a customer. Once an optimized purchasing configuration is calculated, the optimized purchasing configuration may be recommended to the customer. For a customer that has multiple computing instances, the optimized purchasing configuration may take into account usage of each of the computing instances that the customer uses. The recommendation may also include changes to a computing instance type used by a customer. As an example, historical information such as central processing unit (CPU) usage and memory usage may be used to identify an appropriate computing instance type. Where a customer is using little CPU and/or memory resources, the technology may recommend that the computing instance type be downgraded to a lower class computing instance.

An optimized purchasing configuration may include disposing of some portions of a customer's existing purchasing configuration. For instance, if a reservation is not used often, the technology may suggest to the customer to sell the reservation to another customer to recoup an upfront cost of the reservation. A computing resource provider may also implement a reservation marketplace that provides a mechanism for customers who no longer want or need their reserved instances to connect with other customers who want to buy shorter term reserved instances than those generally provided by the cloud computing resource provider. A reserved instance may be a virtual computing instance that may be made available to a customer upon demand at a lower price due to purchasing a reservation for the instance. A computing resource provider may set aside capacity in order to ensure that use of a purchased reserved instance may be fulfilled. Alternatively, a computing resource provider may not set aside capacity for a purchased reserved instance. In this way, a reserved instance may be a prepaid discount without necessarily ensuring capacity for a purchased reserved instance.

An optimized purchasing configuration may also include adding new components to the customer's existing purchasing configuration. The customer may be able to use the reservation marketplace to purchase a reservation from another customer, for example, or the customer may purchase a reservation directly from the computing resource provider.

To more clearly describe the technology, examples are now provided with reference to the figures. Accordingly, FIG. 1 illustrates an example optimization 100 in a virtualized computing environment. As illustrated, the optimization 100 is applied to three virtualized computing instances 102, 104, 106. The three virtualized computing instances 102, 104, 106 may belong to a customer and may exist as a subset of many virtualized computing instances in a virtualized computing environment.

The three virtualized computing instances 102, 104, 106 each have provided respective usage ratios 112, 114, 116. The usage ratios 112, 114, 116 may, for example, represent the percentage in which the virtualized computing instance is in use during a specific time period. More precisely, a virtualized computing instance may be activated and deactivated in a manner that simulates a physical computing machine being turned on and off, respectively. The usage ratios 112, 114, 116, therefore, may represent the ratio in which the virtualized computing instance is in use (e.g. active) over a time period. The virtualized computing instance 102, for instance, may have been used (e.g. activated) for 7 or 8 hours over a time period of a month (e.g. 720 hours), and therefore has a usage ratio of 1%. In an alternative configuration, the percentage may represent an average percentage of computing resources used over time on the virtualized computing instance. For example, the CPU may be used at an average 34% capacity over time.

The provided usage ratios 112, 114, 116, of the virtualized computing instances 102, 104, 106 may be categorized into various capacity levels. Four buckets are illustrated in FIG. 1 to depict four separate capacity levels, namely a no reservation capacity level 120, a light use reservation capacity level 122, a medium use reservation capacity level 124 and a heavy use reservation capacity level. Infrequently used virtualized computing instances may be categorized into the no reservation capacity level 120, while virtualized computing instances with increasing levels of use may be categorized in the light use reservation capacity level 122, the medium use reservation capacity level 124 and the heavy use reservation capacity level as appropriate. A determination of what capacity level a usage ratio is categorized into may be driven, for example, by a total estimated cost for a customer. With the usage ratio of 56% 114 an upfront cost for a light use reservation may be offset by a lower hourly usage rate. Since it appears that the virtualized computing instance 104 has a usage ratio of 56%, the hourly usage rate for the virtualized computing instance 104 may be a more significant cost over a time period (e.g. a year or three years) than the upfront cost associated with the light use reservation. A light use reservation may be differentiated from a medium use reservation or a heavy use reservation based in part on the expected used of the reservation with a virtualized computing instance. Additionally, a light use reservation may have a smaller up front cost than a medium use or a heavy use reservation, but may have a higher hourly usage costs than a medium use or a heavy use reservation, for example.

A reservation for a virtualized computing instance may be one of several types of capacity reservations. For example, virtualized storage, virtualized networking, virtualized database usage and other resources or services may be offered to customers through a capacity reservation model.

Thus an optimized purchasing configuration 130 for using the virtualized computing instances 102, 104, 106 may be calculated based in part on the capacity levels 120, 122, 124, 126. In one example, the optimized purchasing configuration 130 may include a calculated reservation cost for each categorized usage ratio as well as estimated usage costs for each virtualized computing instance.

The optimized purchasing configuration 130 may be recommended to a customer. A page 140 on an Internet site may be used to present an explanatory recommendation to the customer. In other examples, a command line interface may be invoked and information may be outputted to a console or file.

Optimizing virtualized computing usage may also include providing a list of current capacity reservations associated with a customer in a virtualized computing environment. For instance, a customer may already have a light use reservation that may be able to service the virtualized computing instance 104. In this way, an unused capacity reservation, or an underused capacity reservation, within current capacity reservations for a customer may be identified that matches the capacity level being sought. Thus, the capacity reservation may be recommended as a reservation for the virtualized computing instance.

In another optimization of virtualized computing, a capacity reservation within current capacity reservations associated with the customer may be identified that does not match any capacity levels categorized for a plurality of virtualized computing instances associated with the customer. Accordingly, removal of the capacity reservation may be recommended. The customer, for example, may sell the capacity reservation on a reservation marketplace. In yet another optimization of virtualized computing, a new capacity reservation may be an optimization and thus may be recommended to be purchase for a virtualized computing instance.

Figure 2:
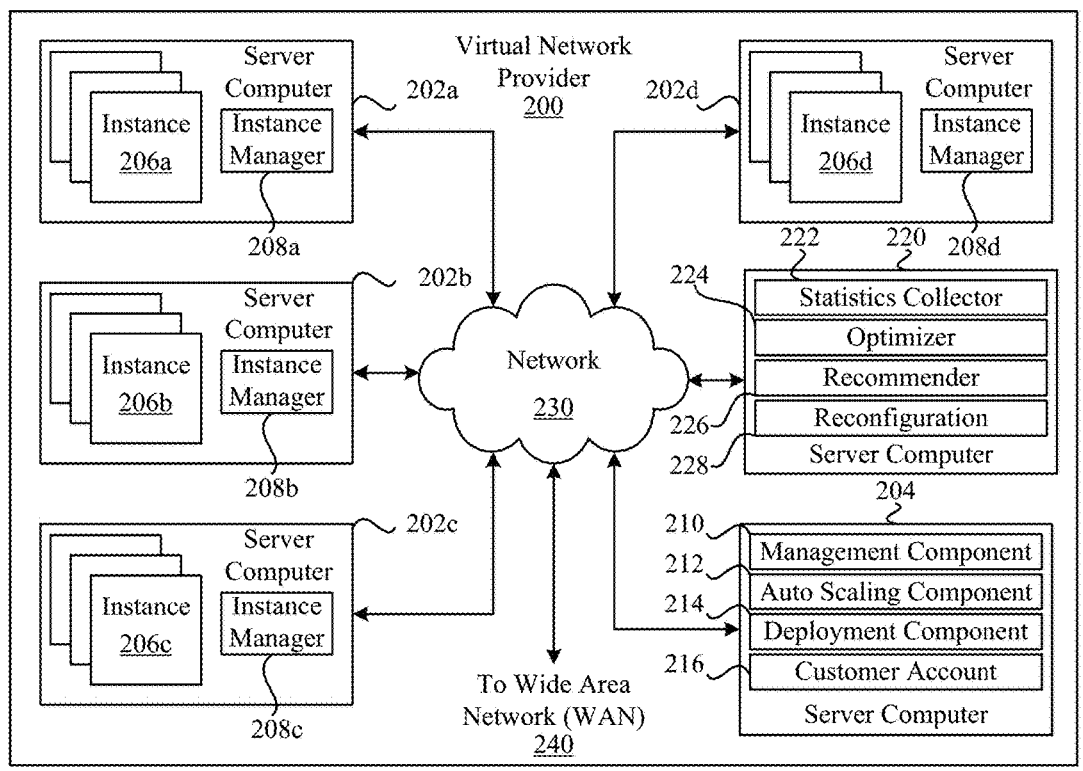
FIG. 2 illustrates an example of a virtualized network provider with a server computer that provides various optimization services.

FIG. 2 illustrates an example of a virtualized network provider 200 with a server computer that provides various optimization services. In particular, a network-based virtual network provider 200 is depicted that illustrates one environment in which the technology described herein may be used. More particularly, the virtual network provider 200 may provide a virtualized computing environment with a plurality of virtualized computing instances.

The virtual network provider 200 (e.g., the cloud provider) is capable of delivery of computing and storage capacity as a service to a community of end recipients. In one example, the virtual network provider can be established for an organization by or on behalf of the organization. That is, the virtual network provider 200 may offer a "private cloud environment." In another example, the virtual network provider 200 supports a multi-tenant environment, where a plurality of customers operate independently (i.e., a public cloud environment). Generally speaking, the virtual network provider 200 can provide the following models: Infrastructure as a Service ("IaaS"), Platform as a Service ("PaaS"), and/or Software as a Service ("SaaS"). Other models can be provided. For the IaaS model, the virtual network provider 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the virtual network provider platform without the cost of buying and managing the underlying hardware and software. The SaaS model allows installation and operation of application software in the virtual network provider. End users may access the virtual network provider 200 using networked client devices, such as desktop computers, laptops, tablets, smartphones, etc. running web browsers or other lightweight client applications, for example. Those skilled in the art will recognize that the virtual network provider 200 can be described as a "cloud" environment.

The virtual network provider 200 includes a plurality of server computers 202*a-d*. While only four server computers are shown, any number can be used, and large centers can include thousands of server computers. The server computers 202*a-d* can provide computing resources for executing software instances 206*a-d*. Instances 206*a-d* may, for example, be virtual machines. As known in the art, a virtual machine is an instance of a software implementation of a machine (i.e. a computer) that executes applications like a physical machine. In the example of virtual machine, each of the server computers 202*a-d* can be configured to execute an instance manager 208*a-d* capable of executing the instances. The instance manager 208*a-d* can be a hypervisor or another type of program configured to enable the execution of multiple instances 206*a-d* on a single server. Additionally, each of the instances 206*a-d* can be configured to execute one or more applications. The instances 206*a-d* are examples of virtualized computing instances, and a subset of the instances 206*a-d* may be members of one or more network groups.

It should be appreciated that although the discussion herein is primarily in the context of virtual machines, other types of instances can be utilized with the concepts and technologies disclosed herein. For instance, the technologies disclosed herein can be utilized with storage resources, data communications resources, and with other types of computing resources. The technology might also execute all or a portion of an application directly on a computer system without utilizing virtualized computing instances.

One or more server computers 204, 224 can be reserved for executing software components for managing the operation of the server computers 202 and the instances 206*a-d*. For example, a server computer 204 can execute a management component 210. A customer can access the management component 210 to configure various aspects of the operation of the virtualized computing instances 206*a-d* purchased by the customer. For example, the customer can purchase, rent or lease instances and make changes to the configuration of the instances. The customer can also specify settings regarding how the purchased instances are to be scaled in response to demand. An auto scaling component 212 can scale the instances 206*a-d* based upon rules defined by the customer. The auto scaling component 212 may allow a customer to specify scale-up rules for use in determining when new instances should be instantiated, and scale-down rules for use in determining when existing instances should be terminated, for example. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist customers in the deployment of new instances 206*a-d* of computing resources. The deployment component can have access to account information associated with the instances, such as who is the owner of the account, credit card information, country of the owner, etc. The deployment component 214 can receive a configuration from a customer that includes data describing how new instances 206*a-d* may be configured. For example, the configuration can specify one or more applications to be installed in new instances 206*a-d*, provide scripts and/or other types of code to be executed for configuring new instances 206*a-d*, provide cache logic specifying how an application cache should be prepared, and other types of information. The deployment component 214 can utilize the customer-provided configuration and cache logic to configure, prime, and launch new instances 206*a-d*. The configuration, cache logic, and other information may be specified by a customer using the management component 210 or by providing this information directly to the deployment component 214.

Customer account information 216 can include any desired information associated with a customer of the multi-tenant environment. For example, the customer account information may include a unique identifier for a customer, a customer address, billing information, licensing information, customization parameters for launching instances, scheduling information, auto-scaling parameters, etc. As described above, the customer account information 216 may also include security information used in the encryption or signing of asynchronous responses to API requests. By "asynchronous" it is meant that the API response can be made at any time after the initial request and with a different network connection.

A network 230 can be utilized to interconnect the server computers 202*a-d* and the server computers 204, 220. The network 230 can be a local area network (LAN) and can be connected to a Wide Area Network (WAN) 240 so that end users can access the virtual network provider 200. As discussed in greater detail below with reference to FIG. 7, the WAN 240 may be used by a virtual private network (VPN) access point (AP) to provide access to an external member instance to an overlay network within the virtual network provider 200. It should be appreciated that the network topology illustrated in FIG. 2 has been simplified and that many more networks and networking devices can be utilized to interconnect the various computing systems disclosed herein. More particularly, the network 230 may implement a physical network on which an overlay network may be based.

The server computer 220 may collect usage info for virtualized computing instances, calculate an optimized purchasing configuration and may recommend the optimized purchasing configuration to a user and/or customer. Accordingly, the server computer 220 may include various modules or components including a statistics collector 222, an optimizer 224, a recommender 226, a reconfiguration module 228 and other modules to implement the functionality of the technology described herein. For instance, the server computer 220 may include a module to identify software licensing costs for a virtualized computing instance and in this way may arrive at the optimized purchasing configuration based in part on the identified software license costs. Some software, for example, may be licensed on a per central processing unit (CPU) cost per hour. Additionally, some software vendors may choose to provide prepaid or reserved licensing models that may be complex for a consumer to optimize.

The statistics collector 222 may collect various usage information regarding virtualized computing instances (e.g. instances 206a-d). For example, the statistics collector 222 may aggregate central processing unit (CPU) utilization for virtualized computing instances, or may aggregate a percentage of how often a virtualized computing instance is in use. Thus, the statistics collector 222 may gather processor utilization load for a virtualized computing instance for a period of time. In a more general sense, the statistics collector 222 gathers usage information about a plurality of virtualized computing instances in a virtualized computing environment. For example, the statistics collector 222 may aggregate information about memory, storage, networking bandwidth or utilization of other virtualized computing instance resources. Further, the optimizer 224 may calculate an optimized purchasing configuration for the plurality of virtualized computing instances in the virtualized computing environment, and the recommender 226 may provide the optimized purchasing configuration of the plurality of virtualized computing instances to a customer.

The reconfiguration module 228 may be used to apply the optimized purchasing configuration presented by the recommender 226. The reconfiguration module, for instance, may repurpose existing capacity reservations to conform to the optimized purchasing configuration or may add or remove capacity reservations. Thus, the reconfiguration module 228 may reconfigure the plurality of virtualized computing instances to the optimized purchasing configuration. This reconfiguration may occur without the customer's intervention if the customer has setup the reconfiguration to occur after the optimizer 224 has analyzed the customer's virtual computing instances. In an alternative configuration, the reconfiguration may request permission from the customer before making any changes.

It should be noted that while the server computer 220 is shown with the statistics collector 222, the optimizer 224, the recommender 226 and the reconfiguration module 228 these modules and/or components may be separated and spread over one or more computers. Further, the server computing 220 may be a physical computing machine, or may be a virtualized computing instance.

Figure 3:
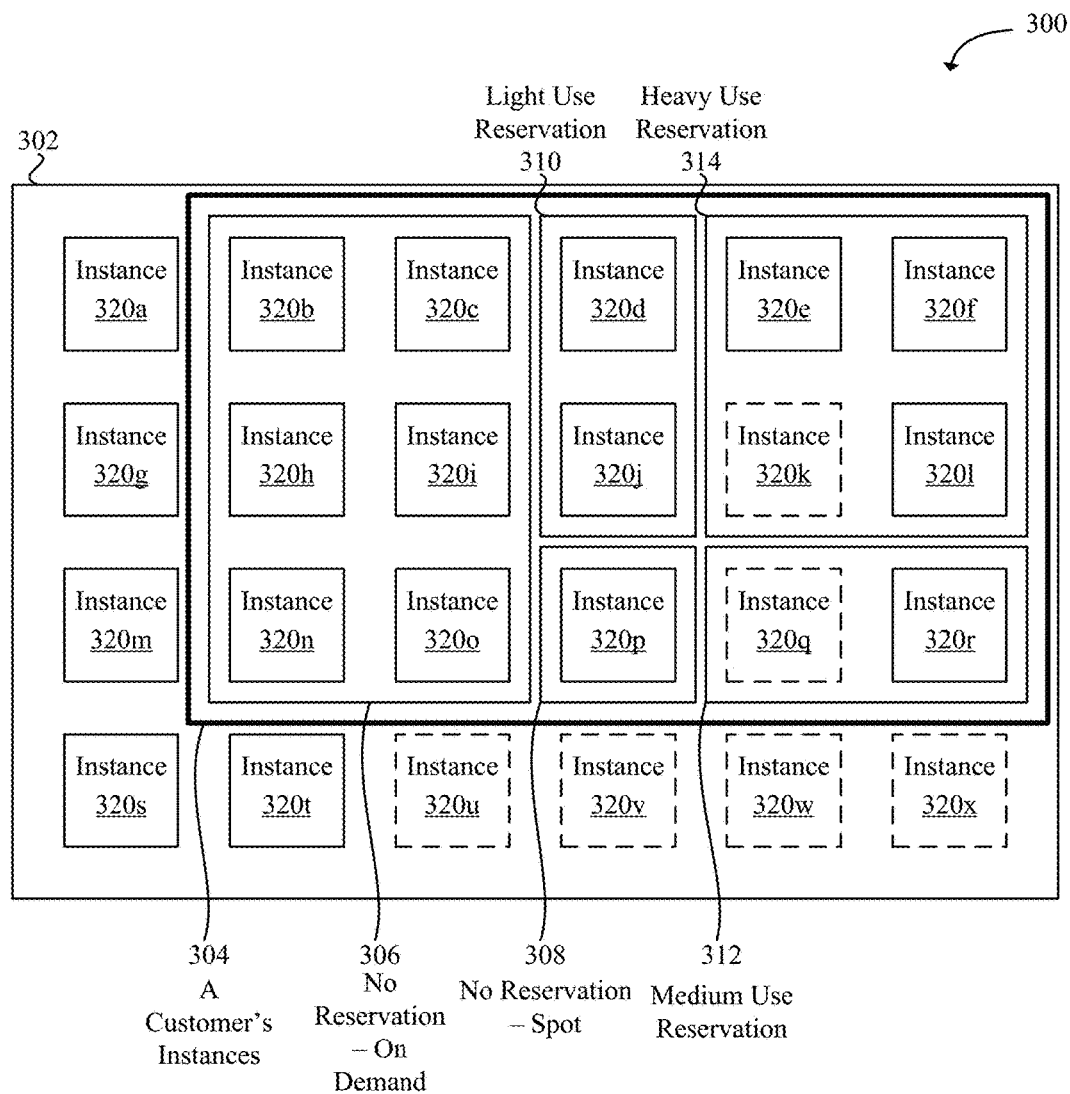
FIG. 3 illustrates an example of allocating virtualized computing instances in a virtualized computing environment

FIG. 3 illustrates an example 300 of allocating virtualized computing instances in a virtualized computing environment 302. The virtualized computing environment 302 may be implemented as discussed with reference to FIG. 2. A subset 304 of virtualized computing instances 320a-w may be owned and/or controlled by a customer. Within the subset 304 of virtualized computing instances owned and/or controlled by the customer, various capacity levels and reservations are depicted. For instance an on-demand capacity level 306, a spot capacity level 308, a light use reservation capacity level 310, a medium use reservation capacity level 312 and a heavy use reservation capacity level 314 are depicted. The on-demand capacity level 306 may charge a customer a relatively high per unit time price for usage of the instances 320b, 320c, 320h, 320i, 320n, and 320o. However, the on-demand capacity level 306 may not require an upfront commitment and/or cost from the customer to allocate the instances 320b, 320c, 320h, 320i, 320n, and 320o.

In contrast, the light use reservation capacity level 310, the medium use reservation capacity level 312 and the heavy use reservation capacity level 314 may require various levels of upfront commitments and/or costs from the customer to allocate instances with those reservation capacity levels. Hourly usage costs, however, may be reduced as a result in using those reservation capacity levels. As an example, the light use reservation capacity level 310 may make economic sense for a customer when usage of an instance (e.g. 320d, 320j, 320p) is above 50%. More precisely, an annual reservation cost may be offset by a lower hourly cost, as compared to use of an instance within the on-demand capacity level 306, when a reservation is used more than half of the year.

The medium use reservation capacity level 312 may make economic sense for a customer when usage of an instance (e.g. 320q, 320r) is above 75%. Similarly, the heavy use reservation capacity level 314 may make economic sense for a customer when usage of an instance (e.g. 320e, 320f, 320k, 320l) is above 90%.

The spot capacity level 308 may be a way for the virtualized network provider to sell excess capacity within a market based environment. In an auction, various customers may bid on blocks of excess capacity, for instance. Customers may set a ceiling price they are willing to pay in order to run their instances. Accordingly, the spot capacity level 308 may make sense to consumers who have sporadic computational jobs that may not be particularly time-sensitive.

The virtualized computing environment 302 depicted in FIG. 3 also illustrates that some instances may not be active as illustrated by instances with dotted containers (e.g. 320k, 320q, 320u, 320v, 320w, 320x). Additionally some reservations for a customer may be unused or underused, at any one moment. For instance, while the heavy use reservation capacity level 314 for the customer has four slots or reservations, only three are depicted as currently being used (e.g. 320e, 320f, and 320l). Thus, in using the described technology, a plurality of virtualized computing instances in a virtualized computing environment may be identified and purchasing configuration optimization rules may be applied to calculate an optimized purchasing configuration. One example optimization rule may be to ensure that existing reservations are used to the greatest extent possible. In this way, the optimized purchasing configuration may be recommended to a customer, for example, to help the customer save money.

As a further example, applying purchasing configuration optimization rules may include identifying a capacity reservation within a list of current capacity reservations associated with a customer in the virtualized computing environment that can be used for one of the plurality of virtualized computing instances to arrive at the optimized purchasing configuration. As another example, determining the purchasing configuration may include identifying a capacity reservation associated with the computing instance that is inefficient for the classified usage category. In this way, the recommended purchasing configuration may include disposal (i.e., sale or trade) of the capacity reservation. As a further example, applying purchasing configuration optimization rules may include identifying that a new capacity reservation is to be made in the virtualized computing environment for use with a virtualized computing instance to arrive at the optimized purchasing configuration. In this manner, a computing instance may be classified into one of a plurality of usage categories and a purchasing configuration for the computing instance may be determined based at least in part on its classified usage category.

In disposing of or selling a capacity reservation and/or procuring a new capacity reservation, a conditional reservation may be placed on the capacity reservation. The conditional reservation is conditioned upon whether an existing capacity reservation is successfully transferred from the customer on a capacity reservation market.

In some examples, a parent-account in a computing environment may include multiple sub-accounts. Optimization in these examples may occur at the sub-account level, the parent-account level or both the sub-account level and the parent-account level. For example, optimization of one sub-account may determine that a reserved instance should be disposed of, while another sub-account may determine that optimization means a new reserved instance should be acquired. At the parent-account level, the optimization requirements of the two sub-accounts may potentially be met by moving usage of the reserved instance from the first sub-account to the second sub-account. Policy controls may be implemented to limit the optimization technology's access to information for parent- accounts and sub-accounts. For example, a user of a child account may not have any access to information in the parent account and thus the optimization technology may not access that information either.

Figure 4:
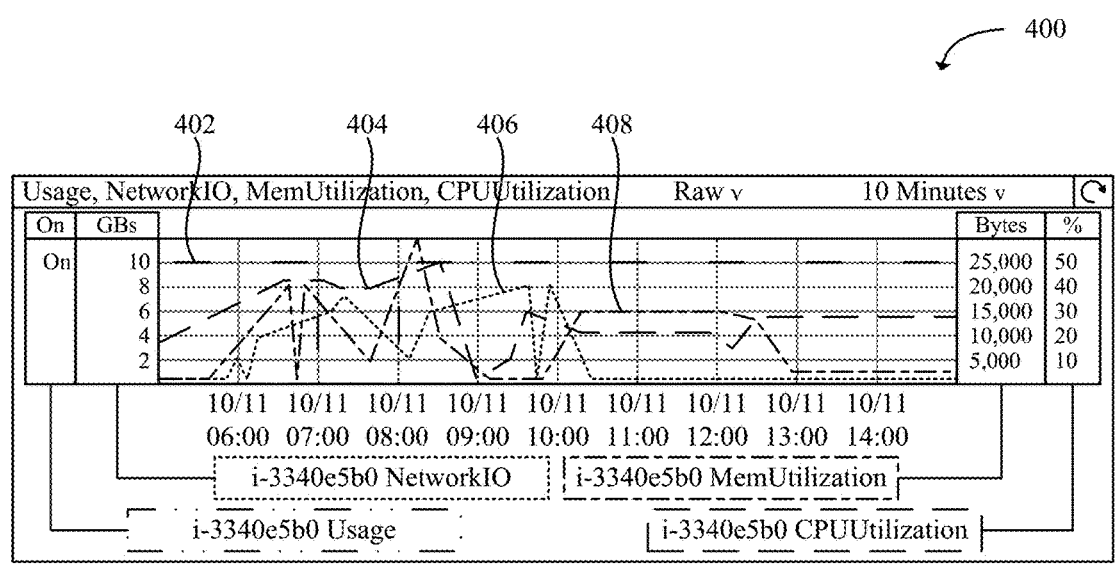
FIG. 4 illustrates an example of gathered usage information for a virtualized computing instance.

FIG. 4 illustrates an example of gathered usage information 400 for a virtualized computing instance. Various statistics may be gathered at regular intervals for a plurality of virtualized computing instances. Information for each virtualized computing instance may categorized by an identifier for the virtualized computing instance. As an illustrative example, in FIG. 4, the identifier for represented virtualized computing instance is 'i-3340e5b0'. One statistic that may be collected is usage 402 of the virtualized computing instance. In an example, usage of the plurality of virtualized computing instances may be identified in part by calculating a usage ratio for each of the plurality of virtualized computing instances for a time period, wherein the usage ratio for a virtualized computing instance is based in part on how often the virtualized computing instance is executing during the time period. In another example, usage of the plurality of virtualized computing instances may be identified in part by identifying processor (CPU) utilization 404 for each of the plurality of virtualized computing instances for a period of time. Other exemplary statistics depicted in FIG. 4 that may be collected and used for optimization include, as non-limiting examples, network input/output 406 (I/O), memory utilization 408, storage utilization or other virtualized computing resources.

Figure 5:
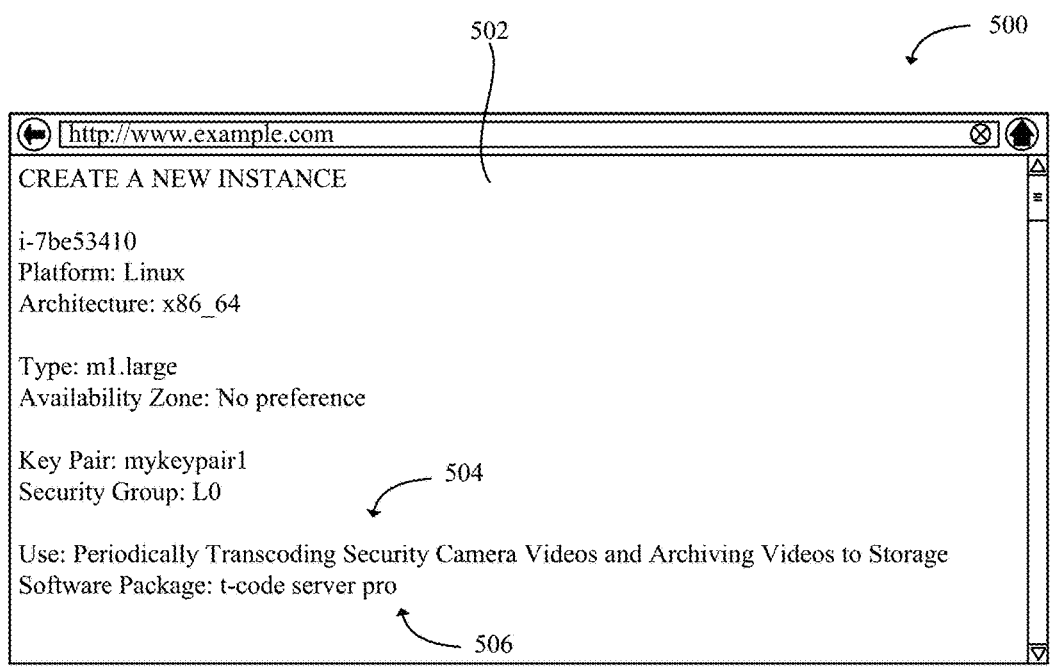
FIG. 5 illustrates an example of usage labels for optimization in a virtualized computing environment.

FIG. 5 illustrates an example 500 of usage labels 504, 506 for optimization in a virtualized computing environment. The usage labels 504, 506 may be presented and/or modified through a page 502 on an Internet site. In one example, the usage label 504 may be a free-form text field that a customer enters a description in. Alternatively, the usage label 504 may allow a customer to select a usage label 504 from a set of preset usage labels. The usage label 506 may be provided by an instance template provider. The instance template provider may create an instance template with various software and configurations made to a virtualized computing instance to provide a particular functionality. For example, an instance provider may create a transcoder server instance template that provides functionality for transcoding a moving pictures expert group 2 (MPEG-2) based video to a MPEG-4 based video. A customer using the transcoder server instance template to create a virtualized computing instance may have the usage label 506 included by default with the instance template. Thus, a usage label for a virtualized computing instance may be provided and the capacity level for the virtualized computing instance may be determined based in part on the usage label. For example, the usage labels 504, 506 may indicate that the virtualized computing instance is used sporadically or temporarily, or that the virtualized computing instance may not be very time sensitive. With the usage labels 504, 506 in mind, a batch purchasing configuration for the virtualized computing instance may be recommended in some instance. A customer that uses a virtualized computing instance to analyze genetic sequences may be less concerned about when the virtualized computing instance is executing and may be more sensitive to the costs of using the virtualized computing instance. It may therefore be beneficial for the customer to use excess virtualized computing capacity to execute the virtualized computing instance to analyze genetic sequences. A batch purchasing configuration may allow a customer to name their own price for using a virtualized computing instance. A customer may bid on spare or excess computing capacity and use the virtualized computing instance whenever their bid exceeds a market price. The market price may vary in based on supply and demand.

Alternatively, the usage labels 504, 506 for the virtualized computing instance may identify a usage load type. As an example, a usage label may indicate that a virtualized computing instance is a server for an Internet site that is generally always available on the Internet. In this way, the usage label may indicate that the virtualized computing instance is nearly always being used and a reserved instance may be more cost effective for the customer.

Figure 6:
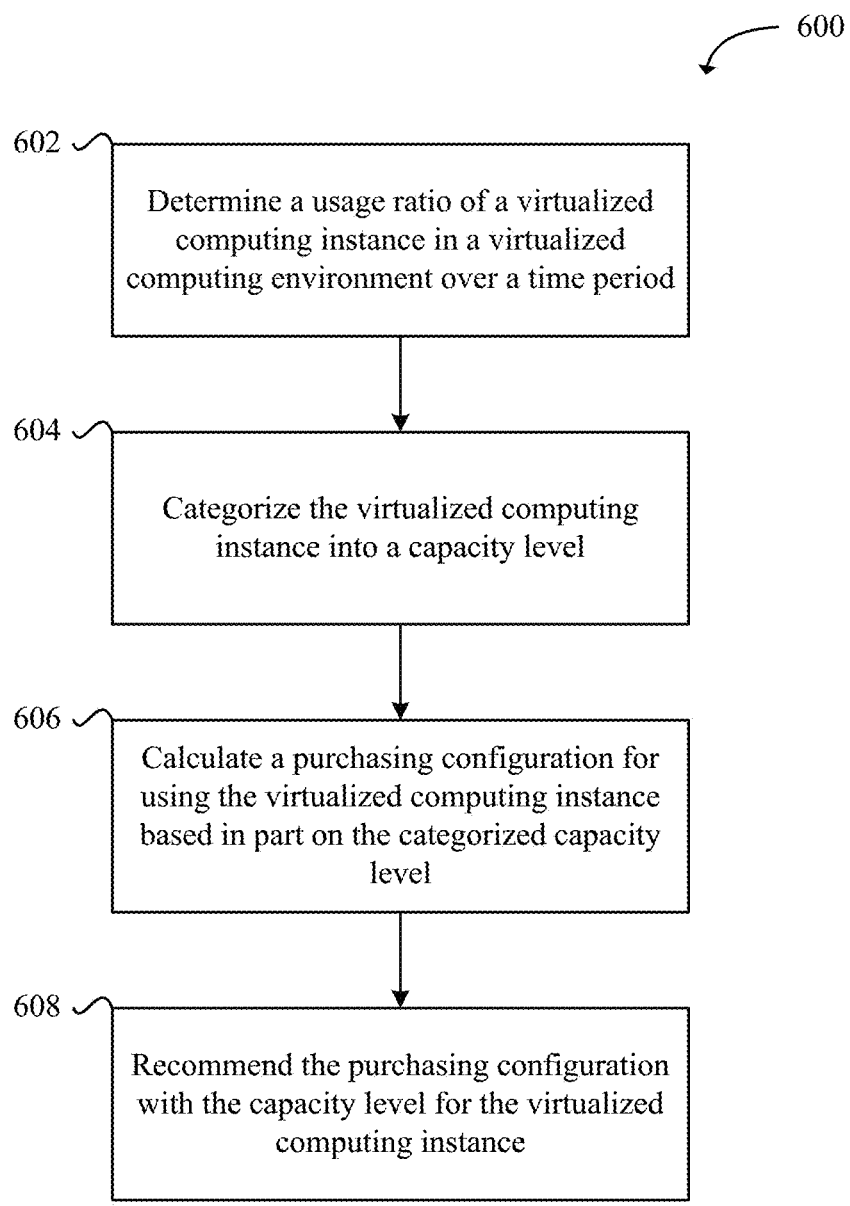
FIG. 6 is a flowchart illustrating an example method to optimize virtualized computing usage.

FIG. 6 is a flowchart illustrating an example method 600 to optimize virtualized computing usage. The method 600 may include determining a usage ratio of a virtualized computing instance in a virtualized computing environment over a time period, as shown in method element 602. A usage ratio may represent the percentage in which the virtualized computing instance is in use over time. A virtualized computing instance may be activated and deactivated in a manner that simulates a physical computing machine being turned on and off, respectively. A usage ratio, therefore, may represent the ratio in which the virtualized computing instance is in use (e.g. active) over a time period. The method 600 may also include categorizing the virtualized computing instance into a capacity level, as shown in method element 604. The virtualized computing environment may have a plurality of capacity levels. As discussed above with reference to FIG. 2, a virtual network provider 200 may provide a virtualized computing environment with a plurality of virtualized computing instances therein. In an illustrative example, the virtualized computing environment may have four separate capacity levels: a no reservation capacity level, a light use reservation capacity level, a medium use reservation capacity level and a heavy use reservation capacity level. Infrequently used virtualized computing instances may be categorized into the no reservation capacity level, while virtualized computing instances with increasing levels of use may be categorized into the light use reservation capacity level, the medium use reservation capacity level and the heavy use reservation capacity level as appropriate.

The method 600 may further include calculating a purchasing configuration for using the virtualized computing instance based in part on the categorized capacity level, as shown in method element 606, and recommending the purchasing configuration with the capacity level for the virtualized computing instance, as shown in method element 608. Optimizing virtualized computing usage may also include using a list of current capacity reservations associated with a customer in a virtualized computing environment. For instance, a customer may already have a light use reservation that may be able to service the virtualized computing instance. A capacity reservation within current capacity reservation may be identified that matches the capacity level being sought and repurposed or reassigned for use by the virtualized computing instance.

Figure 7:
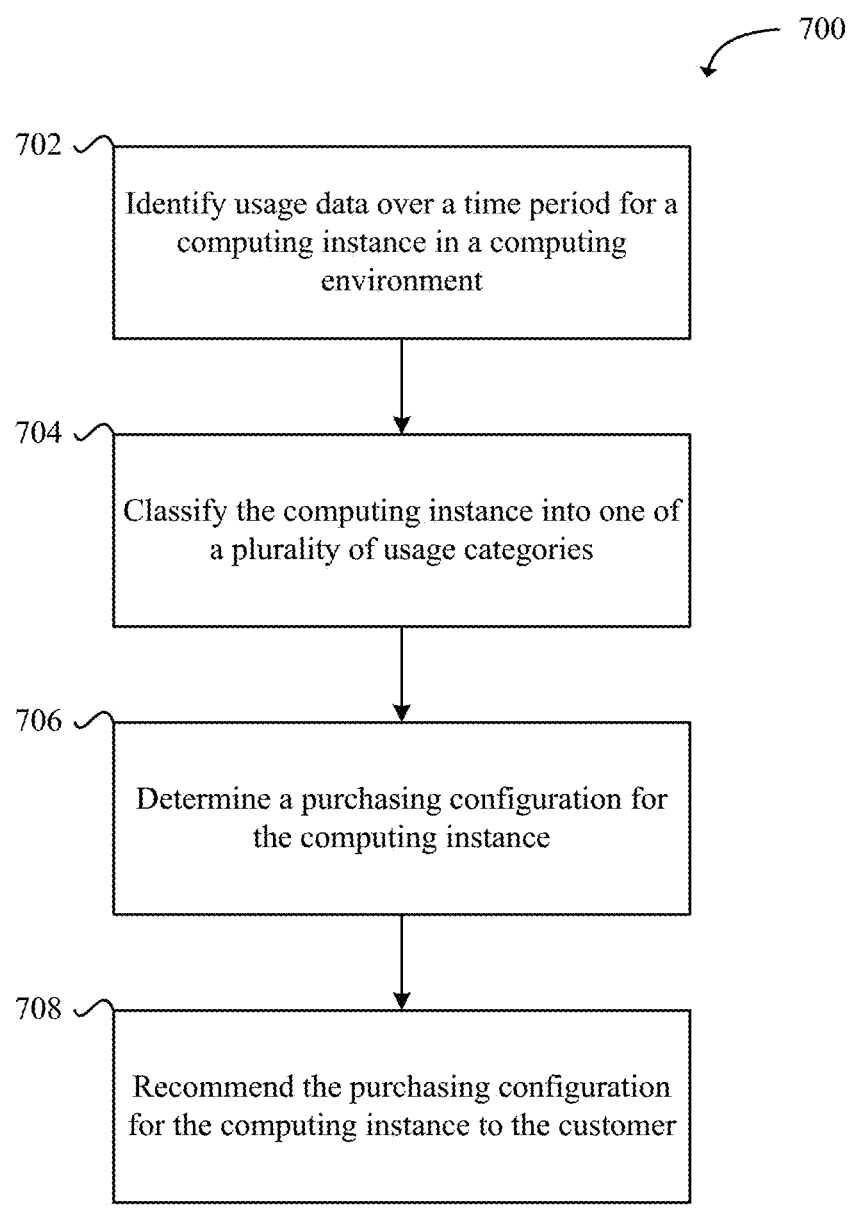
FIG. 7 is another flowchart illustrating an example method for optimization in a virtualized computing environment.

FIG. 7 is another flowchart illustrating an example method 700 for optimization in a virtualized computing environment. The method 700 may include identifying usage data over a period of time for computing instance in a computing environment, as shown in method element 702, and classifying the computing instance into one of a plurality of usage categories, as shown in method element 704. Identification of usage may be for a customer of a computing environment operated by a service provider. As an example, purchasing configuration optimization rules may dictate that a heavily used virtualized computing instance should have a purchasing configuration that includes a reservation with an upfront cost. The method 700 may also include determining a purchasing configuration for the computing instance, as shown in method element 706. The purchasing configuration may be based at least in part on the computing instance's classified usage category. The method 700 may also include recommending the purchasing configuration for the computing instance to the customer, as shown in method element 706. As a couple of examples, the optimized purchasing configuration may include disposal of the capacity reservation, and/or a new capacity reservation is to be made in the virtualized computing environment for use with a virtualized computing instance to arrive at the optimized purchasing configuration.

Figure 8:
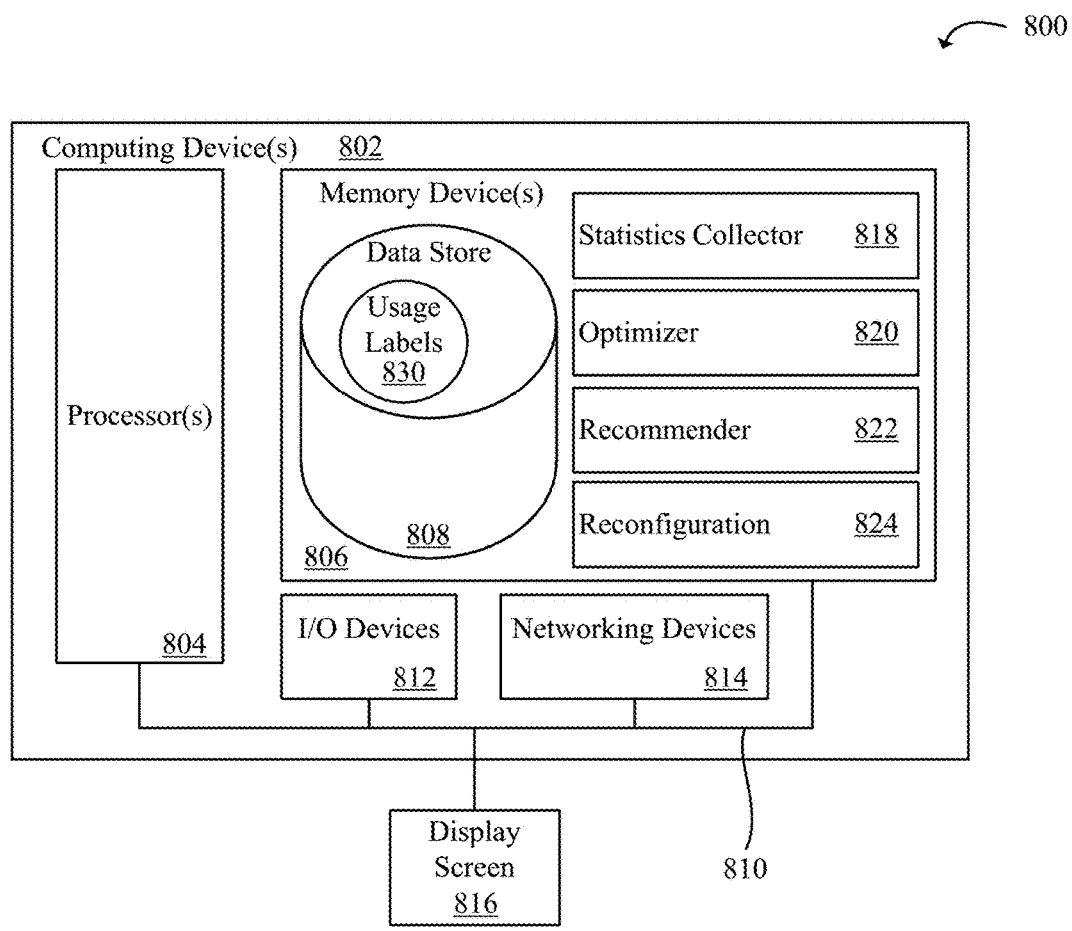
FIG. 8 is block diagram illustrating an example of a computing device that may be used for optimization in a virtualized computing environment.

FIG. 8 is block diagram illustrating an example of a computing device 800 that may be used for optimization in a virtualized computing environment. In particular, the computing device 802 illustrates a high level example of a device on which modules of the disclosed technology may be executed. The computing device 802 may include one or more processors 804 that are in communication with memory devices 806. The computing device 802 may include a local communication interface 810 for the components in the computing device. For example, the local communication interface 810 may be a local data bus and/or any related address or control busses as may be desired.

The memory device 806 may contain modules that are executable by the processor(s) 804 and data for the modules. Located in the memory device 806 are modules executable by the processor. For example, a statistics collector 818, an optimizer 820, a recommender 822, a reconfiguration module 824 and other modules to implement the functionality of the technology described herein. The modules may execute the functions described earlier. For instance, the statistics collector 818 may collect various usage information regarding virtualized computing instances. The statistics collector 818 may aggregate central processing unit (CPU) utilization for virtualized computing instances, or may aggregate a percentage of how often a virtualized computing instance is in use. Thus, the statistics collector 818 may gather processor utilization load for a virtualized computing instance for a period of time. In a more general sense, the statistics collector 818 gathers usage information about a plurality of virtualized computing instances in a virtualized computing environment. The optimizer 820 may provide services to calculate an optimized purchasing configuration for the plurality of virtualized computing instances in a virtualized computing environment based in part on usage information gathered by the statistics collector 818. The recommender 822 may present the optimized purchasing configuration of the plurality of virtualized computing instances to the customer. The reconfiguration module 824 may reconfigure the plurality of virtualized computing instances to the optimized purchasing configuration.

A data store 808 may also be located in the memory device 806 for storing data related to the modules and other applications along with an operating system that is executable by the processor(s) 804. For example, the data store 808 may include usage labels 830 for a virtualized computing instance. Usage labels 830, as discussed above with reference to FIG. 5, may be inputted and/or edited through a page in an electronic site. Usage labels 830 may be inputted by an instance template provider or by a user of a virtualized computing instance. Usage labels 830 may help determine the capacity level for virtualized computing instances. For example, a capacity value in a usage label may indicate a video transcoding server which would represent high processor utilization. Knowledge of that use may result in a recommendation for a compute intensive virtualize computing instance recommendation.

Other applications may also be stored in the memory device 806 and may be executable by the processor(s) 804. Components or modules discussed in this description that may be implemented in the form of software using high programming level languages that are compiled, interpreted or executed using a hybrid of the methods.

The computing device may also have access to I/O (input/output) devices 812 that are usable by the computing devices. An example of an I/O device is a display screen 816 that is available to display output from the computing devices. Other known I/O devices may be used with the computing device as desired. Networking devices 814 and similar communication devices may be included in the computing device. The networking devices 814 may be wired or wireless networking devices that connect to the internet, a LAN, WAN, or other computing network.

The components or modules that are shown as being stored in the memory device 806 may be executed by the processor(s) 804. The term "executable" may mean a program file that is in a form that may be executed by a processor 804. For example, a program in a higher level language may be compiled into machine code in a format that may be loaded into a random access portion of the memory device 806 and executed by the processor 804, or source code may be loaded by another executable program and interpreted to generate instructions in a random access portion of the memory to be executed by a processor. The executable program may be stored in any portion or component of the memory device 806. For example, the memory device 806 may be random access memory (RAM), read only memory (ROM), flash memory, a solid state drive, memory card, a hard drive, optical disk, floppy disk, magnetic tape, or any other memory components.

The processor 804 may represent multiple processors and the memory device 806 may represent multiple memory units that operate in parallel to the processing circuits. This may provide parallel processing channels for the processes and data in the system. The local communication interface 810 may be used as a network to facilitate communication between any of the multiple processors and multiple memories. The local communication interface 810 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method to optimize virtualized computing usage, comprising:

under control of one or more computer systems configured with executable instructions:

determining a usage ratio of a virtualized computing instance in a virtualized computing environment over a time period;

categorizing the virtualized computing instance according to the usage ratio into a capacity level, the virtualized computing environment having a plurality of capacity levels that include a no capacity level, a low use capacity level, a medium use capacity level in relation to the low use capacity level, and a high use capacity level in relation to the low use reservation level, wherein increasing use capacity levels are included in the low use capacity level;

calculating a purchasing configuration for using the virtualized computing instance based in part on a categorized capacity level, wherein the purchasing configuration includes a recommendation to purchase a configuration from a reservation capacity level that corresponds to the capacity level of the virtualized computing instance which is one of a plurality of reservation capacity levels, and a recommendation to dispose of a portion of an existing purchase configuration by selling a reserved virtual computing instance, and the recommendation is based in part on an analysis of usage information related to the reserved virtual computing instance; and recommending the purchasing configuration with the capacity level for the virtualized computing instance.

2. The method of claim 1, further comprising:

identifying a capacity reservation within current capacity reservations associated with a customer that matches the capacity level of the virtualized computing instance; and recommending the capacity reservation for the virtualized computing instance.

3. The method of claim 1, further comprising:

identifying a capacity reservation within current capacity reservations associated with a customer that does not match any capacity levels categorized for a plurality of virtualized computing instances associated with the customer; and recommending removal of the capacity reservation.

4. The method of claim 1, further comprising:

identifying that the capacity level does not match any capacity reservations associated with a customer;

identifying a new capacity reservation to modify usage of the virtualized computing instance; and recommending the new capacity reservation for the virtualized computing instance.

5. The method of claim 1, further comprising:

recommending a batch purchasing configuration for the virtualized computing instance where a usage label indicates that the virtualized computing instance is used temporarily and is relatively time-insensitive.

6. A method comprising:

under control of one or more computer systems configured with executable instructions:

identifying, for a customer of a computing environment operated by a service provider, usage data over a time period for a computing instance in the computing environment;

classifying the computing instance according to a usage ratio into one of a plurality of usage categories that include a no capacity level, a low use capacity level, a medium use capacity level in relation to the low use capacity level, and a high use capacity level in relation to the low use capacity level, wherein increasing use capacity levels are included in the low use capacity level;

determining a purchasing configuration for the computing instance, the purchasing configuration based at least in part on its classified usage category, wherein the purchasing configuration includes a recommendation to purchase a configuration from a reservation capacity level that corresponds to the capacity level of the virtualized computing instance which is one of a plurality of reservation capacity levels, and a recommendation to dispose of a portion of an existing purchase configuration by selling a reserved virtual computing instance, and the recommendation is based in part on an analysis of the usage data related to the reserved virtual computing instance; and recommending the purchasing configuration for computing instance to the customer.

7. The method of claim 6, wherein usage data is based at least in part on an amount of time the computing instance is running within the computing environment over the time period.

8. The method of claim 6, wherein the usage data is based at least in part on CPU utilization for the computing instance over the time period.

9. The method of claim 6, wherein the usage data is based at least in part on network utilization, memory utilization, or storage utilization.

10. The method of claim 6, wherein determining the purchasing configuration further comprises identifying a capacity reservation associated with the customer that can be used with the computing instance.

11. The method of claim 6, wherein determining the purchasing configuration further comprises identifying a capacity reservation associated with the computing instance that is inefficient for the classified usage category, and wherein recommending the determined purchasing configuration includes recommending disposal of the capacity reservation.

12. The method of claim 6, wherein determining the purchasing configuration further comprises identifying a capacity reservation to obtain for the computing instance.

13. The method of claim 12, further comprising placing a conditional reservation on the capacity reservation, wherein the conditional reservation is conditioned upon whether an existing capacity reservation is successfully transferred from the customer on a capacity reservation market.

14. The method of claim 6, wherein identifying usage of a plurality of virtualized computing instances comprises identifying a usage label for a virtualized computing instance as indicating a usage load type.

15. The method of claim 14, wherein the usage label indicates a time-sensitivity for usage of the virtualized computing instance.

16. The method of claim 14, wherein the usage label indicates that the virtualized computing instance is sporadically used for relatively short periods of time.

17. A system, comprising:

a processor;

a memory device including instructions to be executed by the processor, wherein execution of the instructions causes the system to:

gather usage information for a plurality of virtualized computing instances in a virtualized computing environment, wherein the plurality of virtual computing instances are classified into a capacity level according to a determined usage ratio, the virtualized computing environment having a plurality of capacity levels that include a no capacity level, a low use capacity level, a medium use capacity level in relation to the low use capacity level, and a high use capacity level in relation to the low use capacity level, wherein increasing use capacity levels are included in the low use capacity level;

calculate an optimized purchasing configuration for the plurality of virtualized computing instances in the virtualized computing environment based in part on usage information gathered, wherein the optimized purchasing configuration includes a recommendation to purchase a configuration from a reservation capacity level that corresponds to the capacity level of the virtualized computing instance which is one of a plurality of reservation capacity levels, and a recommendation to dispose of a portion of an existing purchase configuration by selling a reserved virtual computing instance, and the recommendation is based in part on an analysis of usage information related to the reserved virtual computing instance; and present the optimized purchasing configuration of the plurality of virtualized computing instances.

18. The system of claim 17, further comprising a reconfiguration module to reconfigure the plurality of virtualized computing instances to the optimized purchasing configuration.

19. The system of claim 17, wherein gathering usage information includes gathering processor utilization load for each of a virtualized computing instance for a period of time.

20. The system of claim 17, wherein the optimized purchasing configuration is calculated in part by identifying software licensing costs for a virtualized computing instance.

* * * * *